Sept. 14, 1948.                M. BURCHAM                    2,449,104
              MEANS FOR FACILITATING THE FEATHERING OF
                PROPELLERS RESPONSIVE TO YAW CONTROL
Filed Nov. 6, 1943                                   2 Sheets-Sheet 2
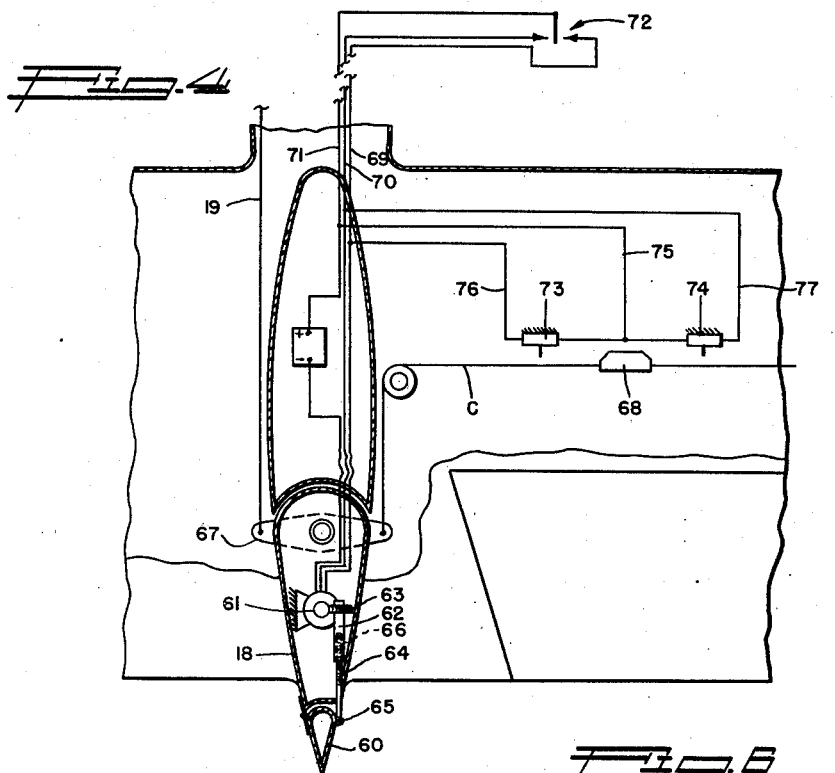
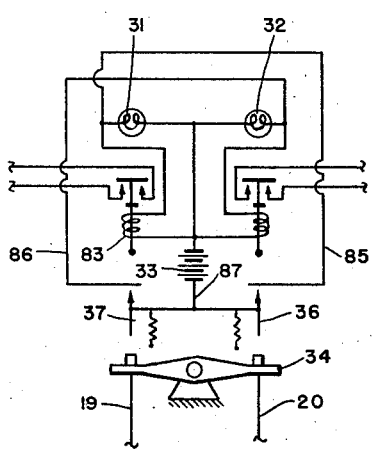
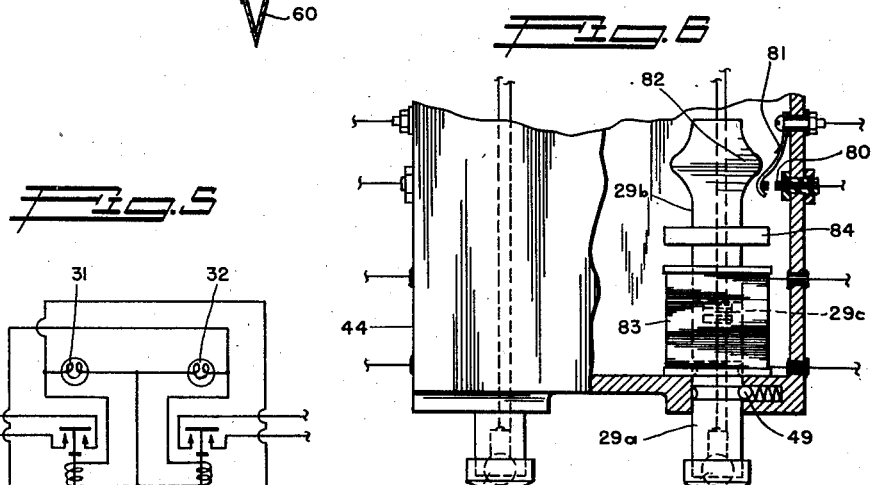
Inventor
Milo Burcham
By *George L. Sullivan*
Agent Patented Sept. 14, 1948

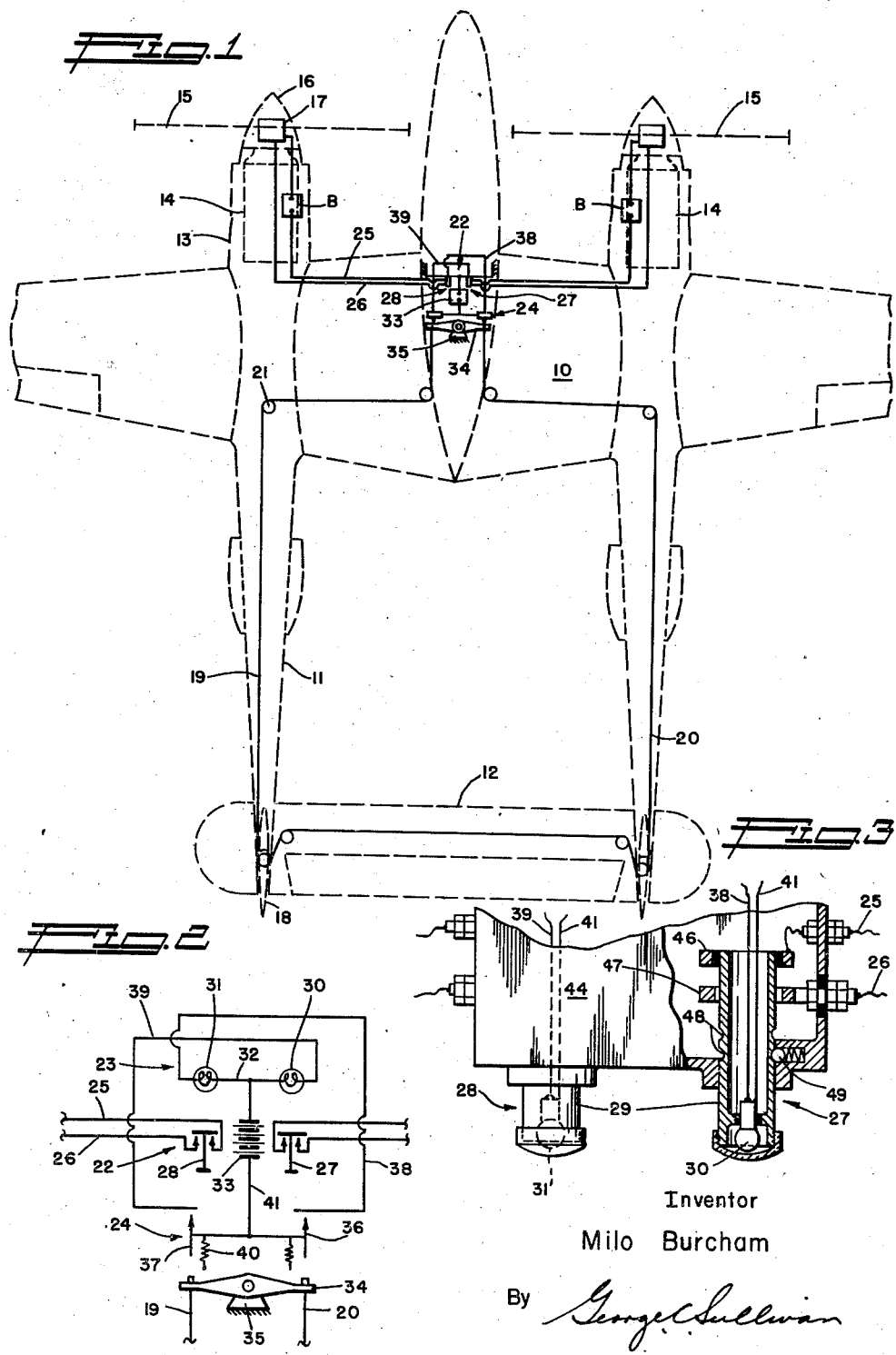

2,449,104

UNITED STATES PATENT OFFICE 2,449,104

MEANS FOR FACILITATING THE FEATHERING OF PROPELLERS RESPONSIVE TO YAW CONTROL

Milo Burcham, Burbank, Calif., assignor to Lockheed Aircraft Corporation, Burbank, Calif.

Application November 6, 1943, Serial No. 509,315

4 Claims. (Cl. 244—51)

This invention relates to control devices and relates more particularly to controls for facilitating the feathering of aircraft propellers.

The failure of one engine of a two engined airplane frequently results in serious consequences. Such engine failure may be caused by malfunctioning or breakage of any one of a number of parts and elements. Upon the failure of an engine, the pilot should take immediate steps to feather its propeller so that the engine will not be injured by reason of the slip stream turning the propeller and thus continue the turning over of the dead engine. It is difficult for the pilot in such an emergency and in the momentary mental confusion that usually results, to instantly determine which engine or engine drive has failed, and in the interval required for this determination, the dead engine may be irreparably damaged or other serious consequences occur. For example, the effect of the extreme yawing movement caused by the failure of one engine during the critical portion of the take-off, if not instantly minimized by feathering of the propeller of the failing engine to reduce the propeller drag, may result in the airplane becoming unmanageable when there is insufficient time and altitude for recovery. There is one thing that invariably transpires when one engine of a two engined airplane fails, namely, the airplane yaws or tends to turn about a vertical axis towards the stalled engine. The pilot instinctively and immediately operates the rudder controls to counteract this tendency of the airplane to yaw. Thus, while there are several other results that may follow the failure of one engine, many of these do not always occur and the one thing that is certain to happen, so long as the pilot is in control, is the instinctive operation of the rudder controls.

It is a general object of this invention to provide a mechanism for automatically indicating which engine of a two engined airplane has failed.

Another and important object of the invention is to provide a means for visibly indicating which feathering switch of a two engined airplane should be operated to feather the propeller of the dead engine. A two engined airplane is equipped with a switch for feathering the propeller of each engine. When the pilot has determined which engine has failed, he must operate the feathering switch of the propeller associated with that engine. Without some means for accurately determining which engine has failed and which feathering switch should be operated, the pilot may allow sufficient time to elapse to cause further injury to the dead engine. The visible indicating means of the invention almost instantly indicates to the operator which feathering switch should be operated so that he may save the dead engine from injury.

Another object of this invention is to provide an indicating means of the character mentioned that is associated with the rudder controls to be operated thereby when the pilot instinctively or automatically takes the steps necessary to correct the yawing of the airplane that always accompanies the failure of one engine. Upon failure of one engine the one operation that is almost invariably bound to take place, is the actuation of the rudder controls to correct yawing. The invention utilizes this operation to provide a signal or indication to advise the pilot of the correct feathering switch to be operated.

Another object of this invention is to provide an indicating mechanism of the character referred to in which the visible signal means are associated with the buttons of the feathering switches so that operation of the correct switch is assured.

Another object of this invention is to provide means for automatically operating a secondary control surface when the rudder control is instinctively operated to correct yawing of the airplane following failure of one of its engines.

A further and important object of the invention is to provide means for automatically operating a feathering switch when the rubber control is instinctively operated to correct yawing of the airplane accompanying failure of one engine. In accordance with the invention, the feathering switch associated with the dead engine is automatically operated to feather the propeller of that engine when the required steps are taken to correct yawing of the airplane.

Other objects and features of this invention will become apparent from the following detailed description of typical preferred forms and applications of the invention throughout which description reference is made to the accompanying drawings in which, Figure 1 is a fragmentary diagrammatic plan view of a two engined airplane embodying or equipped with the indicating mechanism of the invention;

Figure 2 is a wiring diagram of the circuits embodied in the mechanism;

Figure 3 is an enlarged fragmentary view illustrating the manner in which the indicating means may be mounted on the feathering control parts;

Figure 4 is a fragmentary diagrammatic view illustrating the means of the invention for controlling a secondary control surface;

Figure 5 is a view similar to Figure 2 illustrating another form of the invention; and Figure 6 is a view similar to Figure 3 illustrating the feathering switch means of the circuit illustrated in Figure 5.

The indicating means of the invention may be employed on aircraft having propeller feathering means, controls, etc., of different kinds. In the following description I will disclose the invention as employed on one type of a two engined airplane, it being understood that the invention is not to be construed as limited or restricted to this particular application or to the details herein described.

The airplane diagrammatically illustrated in broken lines in Figure 1 includes a body portion 10, twin booms 11, and an empennage 12. Nacelles 13 are formed on the forward ends of the booms 11 and house engines 14 which drive the propellers 15. The hubs 16 of the propellers enclose the motors 17 for feathering the propellers. The propellers 15 and the feathering means may be of any selected or conventional design and the present invention is not primarily concerned with the details of these elements. The empennage 12 is provided with the usual rudders 18 controlled by cables 19 and 20. The cables 19 and 20 extend forwardly to the body 10 and are guided by suitably positioned pulleys 21.

The invention may be said to comprise generally means 22 for controlling or operating the feathering motors 17, indicating means 23 associated with the means 22 and means 24 associated with the rudder controls for operating the indicating means 23.

The means 22 for operating or controlling the feathering motors 17 comprises a circuit for each motor. These circuits include leads 25 and 26 extending from the poles of the feathering motors 17 to switches 27 and 28 suitably positioned in the body 10. In the particular case illustrated, the switches 27 and 28 are of the push-pull type and have suitable operating buttons 29 conveniently accessible to the pilot. I have shown the buttons 29 slidable in openings in a panel or box 44. The inner ends of the buttons 29 carry suitably insulated contactor rings 46. The leads 25 have flexible portions connected with the rings 46. Relatively stationary rings or contacts 47 are supported in the box to be engaged by the rings 46 when the buttons are pulled forwardly. The leads 26 are connected with the contacts 47. Longitudinally spaced annular grooves 48 are formed in the buttons 29 and spring urged detents 49 on the wall of the box are engageable in the grooves to releasably hold the buttons in their "in" and "out" positions. Suitable electric power sources such as batteries B, are connected in the circuits 25—26.

The indicating or signal means 23 is a simple electrically energized visible indicating means. In the embodiment of the invention illustrated, the means 23 includes lamps 30 and 31 associated with the switches 27 and 28 respectively. I have shown the lamps 30 and 31 mounted in the outer ends of the switch buttons 29, it being understood that the lamps may be otherwise positioned. For example, they may be merely arranged in proximity to the buttons of their respective switches. The lamps 30 and 31 may be provided with lenses of contrasting or characteristic colors or bearing suitable indicia. A common lead 32 electrically connects corresponding poles of the lamps 30 or 31 with one side of a battery 33 or other source of electrical energy.

The means 24 is operable to cause selective or individual energization of the lamps 30 and 31. The lamp energizing means 24 is associated with or operated by the rudder control so that upon yawing of the airplane, as a result of the failure of either one of its engines, a lamp 30 or 31 will be energized at the feathering switch 27 or 28 of the dead engine when the rudder control is operated to correct such yawing. The means 24 includes a walking beam 34 pivoted on a relatively stationary support 35. The cables 19 and 20 of the rudder controls are operatively connected with the opposite end portions of the walking beam. The walking beam 34 is adapted to be manually operated in the usual way to control the rudders 18.

The means 23 further includes switches 36 and 37 positioned to be operated by the walking beam 34. The stationary contact of the right hand switch 36 as viewed in Figure 2 is connected with a terminal of the left hand lamp 31 by an electrical lead 38. The stationary contact of the left hand switch 37 is electrically connected with a terminal of the right hand lamp 30 by a lead 39. The movable contacts of the switches 36 and 37 are normally biased to the open positions by springs 40. A common lead 41 connects the movable contactors of the switches 36 and 37 with one side of the power source 33. The movable contacts of the switches 36 and 37 are formed and positioned to be operated by the opposite end portions of the walking beam 34. The switches 36 and 37 are positioned with relation to the walking beam 34 to be unaffected by normal or usual operation of the beam and to be operated only upon emergency or extreme rudder operation. In any event, operation of a switch 36 or 37 during normal flight in no way affects the control or operation of the airplane and merely results in an unnecessary signal or visible indication that may be disregarded.

In the operation of the mechanism it may be assumed that the airplane is in flight. In the event one of the engines 14 stalls or dies, the airplane immediately tends to yaw or turn about the axis of the dead engine. The pilot immediately and instinctively operates the beam 34 to correct this yawing through the agency of the rudders 18. This operation of the walking beam 34 is to an extent sufficient to bring it into operative engagement with the switch 36 or 37 associated with the dead engine. Closing of the switch 36 or 37 completes the circuit of the related lamp 30 or 31. Energization of the lamp carried by or adjacent to the button 29 of the feathering switch instantly indicates to the pilot which engine has failed, and more important, indicates which feathering switch should be operated. The pilot merely operates the switch 36 or 37 indicated by the lighted lamp and thus feathers the propeller 15 of the engine that has failed. This prevents possible irreparable damage to the idle engine.

It is to be observed that the indicating means of the invention in no way interferes with normal control and operation of the airplane. The mechanism is extremely simple and may be light in weight. The indicating device may be incorporated in the airplane without materially altering any of its parts or controls.

Figure 4 illustrates an embodiment of the invention in which operation of the rudder control to correct yawing, which results from failure of one engine, automatically causes operation or movement of one or more secondary control surfaces. In the simple illustrated example of this embodiment, the control surfaces are tabs 60 on the trailing edges of the rudders 18, it being understood that the invention contemplates the automatic operation of one or more control surfaces of any selected character and at preferred or required locations. As diagrammatically illustrated, a tab 60 is hinged or pivoted on the trailing portion of the rudder 18 to move about a generally vertical axis relative to the rudder. The rudder and tab may be of conventional construction. It is to be understood that where the aircraft has two rudders as illustrated in Figure 1, there may be a tab 60 on each rudder 18, and the two tabs may be simultaneously operated by the automatic control of the invention.

The means for automatically operating the control surface or tab 60 comprises a power unit which may be a reversible electric motor 61. The motor 61 is shown mounted within the rudder 18 to move therewith. The axis of rotation of the motor shaft is spaced from and parallel with the axis of movement of the tab 60. A tubular shaft 62 is rotatably supported within the rudder 18 and is driven by the motor 61 through worm gearing 63. A second shaft or rod 64 is received within the tubular shaft 62 and extends rearwardly through a slot in the rudder skin. The outer end of the rod 64 is pivotally connected with the tab 60 at 65, and is suitably restrained against rotation. The pivotal connection 65 of the rod with the tab 60 is spaced from the axis of pivotal movement of the tab. The telescoping shaft 62 and rod 63 have mating internal and external threads 66 so that upon rotation of the shaft 62, the rod 64 is translated or moved axially. It will be seen that the direction of translation of the rod 64 depends upon the direction of rotation of the shaft 62.

The rudder 18 is operated by the cable 19 as above described, the cable being secured to one end of a beam 67 fixed to the pivot of the rudder. The cable C which interconnects the two rudders 18 is attached to the other end of the beam 67. The automatic control for the actuating motor 61 is operated by a moving part associated with the rudder 18. In the diagrammatic illustration, the moving part is a cam 68 fixed to the cable C to move therewith, it being understood that the cam may be otherwise associated with the rudder 18.

The circuit for the motor 61 comprises the usual forward, reverse and intermediate leads 69, 70 and 71. The leads extend forwardly from the motor 61 and pass through the rudder 18 and boom 11 to the cabin or cockpit where they are controlled by a switch 72. The pilot may operate the switch 72 to connect either the forward or the reverse lead 69 or 70 with the lead 71 to produce movement of the tab 60 to the right or to the left as desired. The automatic control for the motor 61 is interposed in the motor circuit and comprises two switches 73 and 74 arranged for operation by the cam 68. The switches 73 and 74 are spaced apart longitudinally of the cable C and have their actuating parts arranged for engagement by the cam 68. The switches 73 and 74 are relatively stationary and are located to be actuated by the cam 68 only upon operation of the beam 34 to extreme or emergency positions. Accordingly, operation of the rudders 18 during normal flight will not bring the cam 68 into engagement with the switches 73 and 74, but in the event that one of the engines 14 fails, the operation of the rudders 18, to correct the resultant yawing, will bring the cam into engagement with a switch. A common tap 75 extends from the lead 71 to terminals of the two switches 73 and 74. Taps 76 and 77 extend from the motor leads 69 and 70 to the other terminals of the respective switches 73 and 74.

It is to be understood that the structure of Figure 4 may be used in conjunction with the apparatus illustrated in Figures 1, 2 and 3. During normal flight the automatic control means for the tabs 60 remains idle but the switch 72 may be operated any time to actuate the tabs 60 and trim the craft as desired. In the event of failure of one of the engines 14 the airplane will yaw and the pilot will instinctively operate the beam 34 to an extreme position to correct the yawing. When this occurs, the rudders 18 are operated by the cables and movement of the cable C brings the cam 68 into operating engagement with one or the other of the switches 73 or 74. Closing of the switch energizes the motor 61 so that the associated tab 60 is automatically moved to a trimming position. During subsequent operation of the rudders 18, the cam 68 may move out of holding or closing engagement with the switch 73 or 74 but the tab will remain in the position to which it has been operated and thus serve as a trimming surface. If the dead engine is re-started, or if for any other reason the pilot wishes to alter the position of the tab 60, he may readily do so at any time by operation of the switch 72. Thus in Figure 4 I have provided means for automatically operating one or more control surfaces simultaneously with instinctive operation of the rudder control accompanying failure of an engine 14.

Figures 5 and 6 illustrate an embodiment of the invention that provides for automatic operation of a feathering switch upon instinctive operation of the rudder control accompanying failure of an engine 14. This form of the invention is similar to the embodiment illustrated in Figures 1, 2 and 3 and corresponding reference numerals are applied to corresponding elements of the two structures.

In the form of the invention illustrated in Figures 5 and 6 the switches for the feathering motors 17 are mounted on the walls of the case 44 and comprise stationary contacts 80 and spring arm contacts 81 for cooperating with the stationary contacts. The contacts 80 and 81 are connected in the circuits 25—26. The push and pull buttons or rods 29ª are slidable in openings in the front wall of the case 44 and are releasably held in their two positions by the detents 49. The inner portions of the rods 29ª carry cams 82 for cooperating with the spring arm contacts 81. Upon forward movement of a rod 29ª its cam 82 moves the related contact 81 into engagement with the adjacent contact 80 to complete the control circuit to a feathering rod 17. The cams 82 are suitably insulated from their rods 29ª.

The operating buttons or rods 29ª are automatically operated when the rudder control is moved to extreme or emergency positions to correct yawing of the airplane. The means for automatically operating the rods 29ª comprise solenoid coils 83 suitably fixed within the case 44 and arranged to surround intermediate portions of the rods. The rods 29ª are preferably sectional and jointed to have inner portions of ferromagnetic material which form the armatures or cores of the coils 83. The portions of the rods extending outwardly from the joints 29ª are preferably of non-magnetic material such as brass, aluminum, or the like. Upon energization of a coil 83, its related rod 29ª is moved outwardly or forwardly so that the cam 82 closes the contacts 80 and 81. Stop flanges 84 on the rods 29ª limit their forward movement.

The coils 83 are under the control of the switches 36 and 37 which in turn are operated by the beam 34 as above described. A lead 85 extends from the stationary contact of the right hand switch 36 to a terminal of the coil 83 associated with the left hand feathering rod 29ª. A similar lead 86 extends from the stationary contact of switch 37 to a terminal of the coil 83 associated with the right hand rod 29ª. A common lead 87 extends from the movable contacts of the switches 36 and 37 to the other terminals of the coils 83 and the battery 33 is interposed in the common lead. The switches 36 and 37 are positioned to be operated by the beam 34 only upon extreme or emergency movements of the beam.

In this form of the invention, the lamps 31 and 32 are not essential but may be employed as indicating devices to indicate to the pilot when their respective feathering switches are closed. I have shown the lamps 31 and 32 suitably mounted in the outer ends of the rods 29ª. The lamp 31 has one side tapped into the line 85 from the switch 36 and the lamp 32 has one terminal tapped into the line 86 from the switch 37. The other sides of the lamps are connected with the common lead 87.

It is believed that the operation of the structure of Figures 5 and 6 will be readily understood. When an engine 14 fails, the airplane immediately begins to yaw and the pilot instinctively operates the beam 34 to correct this yawing. Such operation of the beam 34 closes a switch 36 or 37 and this energizes the coil 83 associated with the related feathering switch. Upon energization of the coil 83, its rod 29ª is moved outwardly to close the feathering switch 80—81 and complete the circuit to the feathering motor 17. Thus the propeller 18 of the dead engine is automatically feathered by the instinctive operation of the pilot made to correct yawing of the airplane. It is to be observed that the feathering switches may be manually controlled or operated at any time by manipulation of the buttons or rods 29ª in the usual manner. The automatic feathering switch operating means of Figures 5 and 6 may be employed in conjunction with the structure of Figure 4.

Having described only typical forms of the invention, I do not wish to be limited to the specific details herein set forth, but wish to reserve to myself any variations or modifications that may appear to those skilled in the art or fall within the scope of the following claims.

I claim:

1. In an airplane having an engine spaced at each side of its longitudinal axis and having its rotational axis substantially parallel therewith, a screw propeller driven by each engine, a separate means for feathering each propeller and a control surface, the combination of a control for said surface having a manually movable control part, a separate control circuit for each feathering means and means operable by the movement of said part, required to correct the yawing of the airplane resulting from failure of an engine, for selectively governing said circuits.

2. In an airplane having an engine spaced at each side of its longitudinal axis, a screw propeller driven by each engine, a separate means for feathering each propeller and a control surface, the combination of a control for said surface having a manually movable control part, a separate control circuit for each feathering means, each control circuit including a switch operable to cause feathering of its respective propeller, and means operable upon movements of said part, required to correct yawing of the airplane resulting from individual failure of the propeller drives, for selectively operating one or the other of the switches.

3. In an airplane having an engine spaced at each side of its longitudinal axis, a propeller driven by each engine, a separate means for feathering each propeller and a control surface, the combination of a control for said surface having a manually movable control part, an operating circuit for each feathering means, a switch in each circuit, electromagnetic means for operating the switches, and means operable by the movement of said part, required to correct yawing of the airplane resulting from the failure of either one of said engines, for selectively energizing the electro magnetic means to feather the propeller driven by said engine.

4. In an airplane having an engine driven propeller spaced at each side of its longitudinal axis, means for feathering the propellers and a control surface, the combination of a control for said surface having a manually movable control part, an operating circuit for each feathering means, a manually operable switch in each operating circuit, an electro-magnetic means for operating each switch, an energizing circuit for each electro-magnetic means, and switches in the last named circuits arranged to be operated by said part when said part is moved to correct yawing of the airplane resulting from failure of one engine, one of the last named switches being arranged to be operated when said part is moved in one direction, the other of said last named switches being arranged to be operated when said part is moved in the other direction.

MILO BURCHAM.

REFERENCES CITED

The following references are of record in the file of this patent:

UNITED STATES PATENTS

| Number | Name | Date |
|---|---|---|
| 945,819 | Stone | Jan. 11, 1910 |
| 2,003,930 | Fischel | June 4, 1935 |
| 2,008,693 | Fator | July 23, 1935 |
| 2,280,654 | Mader | Apr. 21, 1942 |
| 2,321,572 | Campbell | June 15, 1943 |
| 2,330,842 | Pullin | Oct. 5, 1943 |